Oct. 2, 1951 R. G. NORELIUS 2,569,867
ALTERNATING CURRENT ELECTROLOGGING
Filed March 27, 1948 3 Sheets-Sheet 1

INVENTOR.
RUSSELL G. NORELIUS,
BY
Lyle Dillon
ATTORNEY

Fig. 3.

Oct. 2, 1951  R. G. NORELIUS  2,569,867
ALTERNATING CURRENT ELECTROLOGGING
Filed March 27, 1948  3 Sheets-Sheet 3

INVENTOR.
RUSSELL G. NORELIUS,
BY
Lyle Dillon
ATTORNEY.

Patented Oct. 2, 1951

2,569,867

UNITED STATES PATENT OFFICE 2,569,867

ALTERNATING-CURRENT ELECTRO-LOGGING

Russell G. Norelius, Huntington Park, Calif., assignor to Lane-Wells Company, Los Angeles, Calif., a corporation of Delaware Application March 27, 1948, Serial No. 17,478

12 Claims. (Cl. 175—182)

This invention relates, in general, to electrical logging of boreholes and particularly to the electrical logging of the resistivity characteristics of earth formations traversed by well boreholes by means including a plurality of electrodes lowered into such a well on a multiple conductor cable.

This invention utilizes the conventional multiple electrode method of so-called electrical coring or electrical logging of well boreholes, early disclosures of which are found in Slichter 1,826,961, Schlumberger 1,819,923 and 2,141,826 and others, in which current is generated and conducted down through a pair of conductors in a multi-conductor cable to a pair of current input electrodes located within and spaced apart a substantial distance along the longitudinal axis of the well borehole. The two input electrodes thus serve to set up an electric field within the formations traversed by the well bore. The resistivity measurements are generally made by a separate pair of longitudinally spaced potential pick-up electrodes usually positioned within the well bore below the beforementioned current input electrodes, the distance of the spacing between the pick-up electrodes and the lowermost current input electrodes being determined by the so-called lateral depth of penetration of the resistivity measurements desired.

The potential or current signal picked up by the potential pick-up electrodes is conducted back up the multi-conductor cable through a separate pair of conductors which are connected at the surface to suitable measuring apparatus, usually of the recording galvanometer type, by means of which a continuous graphical record of the resistivity measurement variations of the formations surrounding the borehole may be made as the electrodes are moved along the borehole.

The input to the beforementioned current input electrodes has usually been an alternating current in order to make it possible to make resistivity and natural potential measurements simultaneously as is well known in the art. The use of alternating current for the resistivity measurements makes it possible by conventional electrical filter circuits to segregate the resultant alternating signal picked up by the potential pick-up electrodes, from the unidirectional signal resulting from the natural formation potentials. Alternating current is also advantageous in eliminating the undesirable effects of polarization on the surfaces of the current input and potential pick-up electrodes.

As before stated, this electrical logging system necessitates the employment of a multi-conductor cable. Such a multi-conductor cable generally comprises a plurality of insulated conductors usually bunched or twisted together and extending throughout the length of the core of the cable and surrounded by one or more concentric lays of supporting steel wire strands. Such conductor cables may take several forms of construction. A construction heretofore employed in wells of shallower depth resembles that of a rope and is made up of a plurality of twisted, multiple wire strands, each strand having an insulated conductor wire core. This type of conductor cable has relatively good electrical characteristics in so far as both the magnitude of interconductor capacities and interconductor capacity balance is concerned, but is found to be mechanically unsatisfactory particularly in deep wells.

Another type of construction now being employed in present day wells of great depth is that known as the reverse concentric cable, and this cable is constructed of a plurality of concentric, spirally wound single layers of single wires, the lay of each layer being reversed with respect to the adjacent layer. A plurality of insulated conductors are located together in parallel or twisted arrangement at the core. This type of conductor cable has been found to have greatly improved mechanical characteristics for this type of service but due to the close bunching and lack of shielding between the several conductors at the core of the cable, the electrical characteristics relating to interconductor capacity and capacity balance has been found to be undesirable.

In other words, the types of conductor cables which are the most satisfactory for the extreme well depths are the least desirable electrically for electrical logging services.

However, in any event, with any known type of conductor cable, it has been found to be impossible to attain by any manufacturing process yet developed, a perfect balance in the capacity distribution and magnetic coupling between the several insulated conductors thus contained within the cable. Accordingly, the result has always been that when an alternating current is introduced into one pair of the cable conductors a spurious alternating current or potential has been produced in the other pair of pairs of conductors in the cable as the result of such unbalance. Thus, when an alternating current was applied to the pair of conductors leading to the input current electrodes a spurious alternating signal was produced in the pair of conductors leading up from the potential pick-up electrodes, which was super-imposed upon the desired signal received by the pick-up electrodes and delivered to the measuring circuits. Heretofore, in wells of moderate depth and under conditions where a relatively shallow penetration of resistivity measurements was required, the beforementioned spurious signals were tolerated as being of insufficient magnitude to render the measurements unusable although containing a recognized error.

Now, however, as well boreholes, particularly oil wells, are being drilled to relatively greater depths necessitating extremely long conductor cables of high strength and in view of the requirements for deeper lateral penetration of resistivity measurements and greater refinement and detail in these measurements, the spurious effects of the electrical unbalance between conductors in the cable has thereby grown to a magnitude which nearly masks the resistivity measurements sought to be made. The usable sensitivity of this method of electrical logging at great depths has thus, in effect, undergone a great reduction.

A need, therefore, has arisen for increased usable sensitivity of electrical logging resistivity measurement equipment, the accomplishment of which requires the substantial elimination or at least material reduction of the undesirable spurious signal produced between the various conductors in the multi-conductor cable.

Accordingly, it is an object of this invention to provide an electrical logging system of increased useful sensitivity.

It is another object of this invention to provide an electrical logging system in which the resistivity measurements are of improved quality and accuracy and from which the spurious signals transferred between the conductors in the cable are reduced.

It is still another object of this invention to provide a method and apparatus for electrical logging in which substantially all of the reactance and impedance effects associated with the conductor cable and that associated with the logged formations are eliminated.

The objects of this invention are accomplished, in general, by employing an alternating input current having a wave form which includes at some point therein a flat, substantially constant current portion, of which a square wave form is one example, and introducing such alternating current into a pair of conductors in the conductor cable leading down to the input electrodes in the borehole to establish in the surrounding formations an alternating electric field of corresponding wave form, testing this alternating field by means of a pair of spaced potential pick-up electrodes located in the borehole, returning the signal received by the pick-up electrodes up through another pair of conductors in the conductor cable and utilizing for the resistivity measurements only that part of the resultant returned signal from which has been eliminated all extraneous portions thereof which are due to or influenced by the reactance or impedance effects of the conductor cable and the formations.

These and other objects, advantages and features of novelty will be evident hereinafter.

In the drawings which show by way of illustration preferred embodiments of the invention and in which like reference characters designate the same or similar parts throughout the several views.

Figures 1, 2:
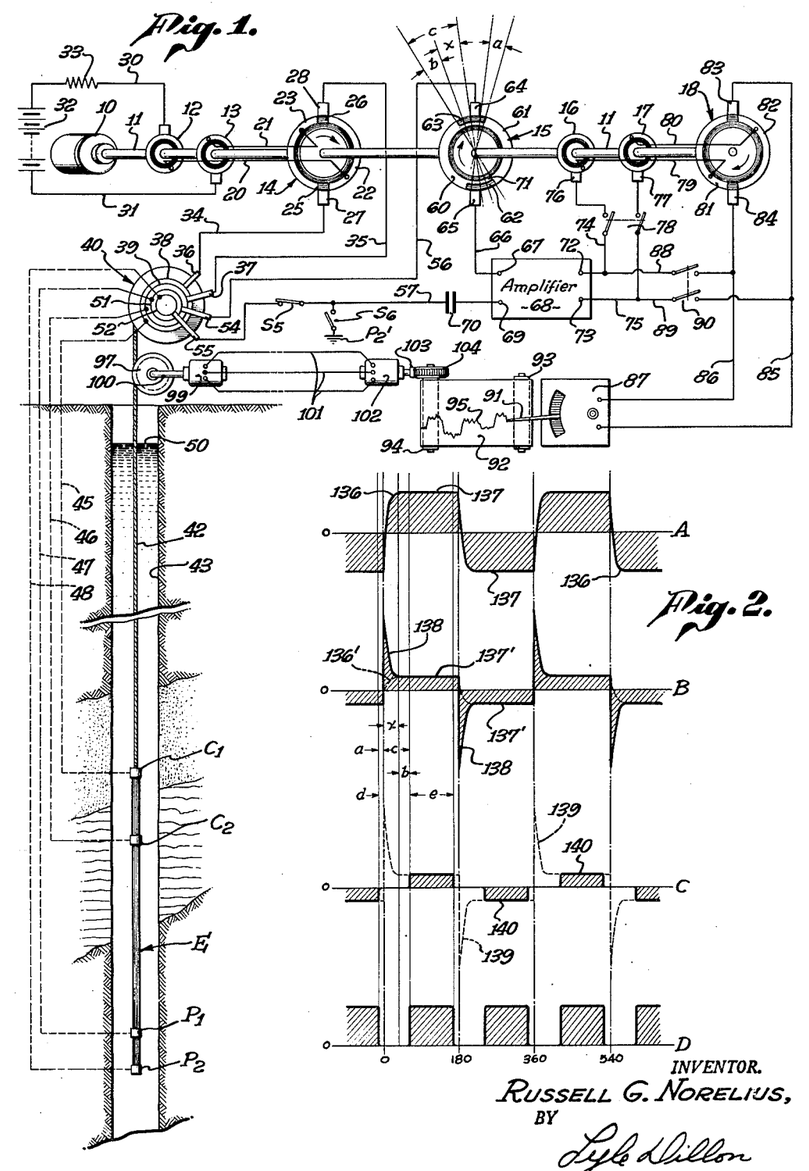
Figure 1 is a schematic diagram of the electrical logging apparatus of the invention as employed in connection with a well borehole.
Figure 2 is a graphical illustration of the general character of the electrical signals occurring at various locations in the electric circuits of the apparatus.

The apparatus is as follows:

Referring primarily to Figure 1, 10 is a suitable prime mover such as an engine or electric motor preferably of constant speed such as a synchronous electric motor, coupled to an elongated rotatable drive shaft 11. Mounted upon and fixed to the shaft 11 for synchronous rotation therewith are a plurality of electrical switching devices comprising a pair of input slip rings 12 and 13, an input generator commutator 14, an output switching commutator or timer 15, a pair of output slip rings 16 and 17 and a rectifier commutator 18.

The input slip rings 12 and 13 are connected by conductor leads 20 and 21, which rotate with the shaft, to the two opposite, approximately semicircular commutator segments 22 and 23 of input commutator 14. The two segments 22 and 23 are separated at their adjacent ends by insulating spacers or fillers of equal width and which may be formed as integral portions of the commutator wheel as shown at 25 and 26. The input commutator 14 is arranged to rotate between and in sliding contact with a pair of oppositely positioned, stationary brushes 27 and 28. The width of the contacting surfaces of the brushes 27 and 28 and the commutator end spacings, as determined by the width of the beforementioned spacers 25 and 26, are preferably although not necessarily equal so that the break in contact of the brushes from the end of one commutator segment will occur substantially simultaneously with its making contact with the adjacent end of the other commutator segment as the commutator rotates thereby avoiding any substantial short circuit between the commutator segments. The commutator segments 22 and 23 are connected by way of the beforementioned slip rings 12 and 13, through conductors 30 and 31 and resistance 33 to a suitable source of direct current such as a direct current generator, or, for example, an electric battery as illustrated in 32. Resistance 33 serves to reduce the effect of any short circuiting between the commutator segments which may occur at the brushes 27 and 28 particularly if the brushes are made slightly wider than insulating segments 25 and 26. The brushes 27 and 28 are connected through suitable electric conductors 34 and 35 to another pair of stationary brushes 36 and 37 which make sliding electrical contact with slip rings 38 and 39 carried on and positioned concentric with the axis of rotation of a conductor cable hoisting drum 40.

A multi-conductor cable, carrying an electrode system assembly E at the lower end thereof, is shown at 42 extending from the drum 40 at the earth surface, upon which it is reeled, into an earth borehole 43. The insulated conductors contained within the cable are diagrammatically illustrated in parallel dotted lines 45, 46, 47 and 48. The cable conductors 45 and 46 make electrical connection at their upper ends at the cable drum with the beforementioned drum slip rings 38 and 39 respectively and the lower ends of said cable conductors 45 and 46 are connected respectively to the spaced, current input electrodes $C_1$ and $C_2$ of the electrode system E.

The electrode system E may be one of a number of arrangements well known in the electrical logging art for lateral resistivity measurements such as that disclosed in Schlumberger 1,819,923 or Bowsky et al. 2,142,555, one conventional arrangement of which is illustrated in Figure 1, hereof and comprises in addition to the beforementioned longitudinally spaced input electrodes, a pair of so-called potential pick-up electrodes $P_1$ and $P_2$ spaced longitudinally from each other and from the input electrodes $C_1$ and $C_2$ and carried upon an elongated insulating tubular body through which the respective conductors extend from the lower end of the conductor cable 42 to the several electrodes.

Electrode $C_1$ may be electrically connected to the lower end of the metal sheath of the cable 42 and thus the whole length of the cable sheath may serve as a grounded electrode of extensive area and longitudinal length within the well. Electrical connection is made between the several electrodes and the formations surrounding the borehole 43 through the conductive well fluid, such as drilling mud, maintained in the borehole, an upper level of which is illustrated at 50, or by means of suitable borehole wall positive contacting means when a relatively non-conducting well fluid, such as oil, is employed.

Cable conductors 47 and 48 are connected at their lower ends with the pick-up electrodes $P_1$ and $P_2$ respectively and at their upper ends with the drum slip rings 51 and 52 respectively.

A pair of stationary brushes 54 and 55 make sliding electrical contact with the drum slip rings 51 and 52 and these are connected through electrical conductors 56 and 57 to the electrical output measuring and log recording apparatus more fully described hereinafter.

The output commutator 15 carries two oppositely positioned commutator segments 60 and 61 connected together electrically internally at 71 and separated or interrupted at the exterior brush contacting surface by insulated blocks or spacer segments 62 and 63 which subtend suitable rotational angles as and for the purpose hereinafter more fully explained. A pair of stationary brushes 64 and 65 make sliding electrical contact with diametrically opposite sides of the commutator surface, and one of the brushes, for example, brush 64 is connected through conductor 56 to the cable drum brush 54 and the other brush 65 is connected through conductor 66 to one input terminal 67 of an amplifier 68, and thence from the other input terminal 69 of the amplifier through a condenser 70 and conductor 57 to the cable drum brush 55.

The output terminals 72 and 73 of the amplifier 68 may be connected respectively through conductors 74 and 75, double pole switch 78, when closed, and brushes 76 and 77 to the slip rings 16 and 17 and thence by way of conductor bars 79 and 80 which rotate with the shaft 11, to the opposite conductive commutator segments 81 and 82 respectively, of rectifier commutator 18.

A pair of stationary, diametrally opposite brushes 83 and 84 make sliding contact with the working surface of commutator 18 and these brushes are respectively connected through conductors 85 and 86 with the terminals of a galvanometer or meter 87. If desired, the output of the amplifier 68 instead of being connected through the rectifier commutator 18 as hereinbefore described may be connected directly from the amplifier output conductors 74 and 75, through conductors 88 and 89, switch 90 and conductors 85 and 86 to the meter 87. With the latter connections the switch 78 will be opened and the switch 90 closed. When the former connections through the rectifier commutator 18 are used and the switch 78 is closed and switch 90 is opened, the beforementioned galvanometer or meter employed at 87 is one adapted to operate on direct or unidirectional current. When the latter connections, which by-pass the rectifier 18, are used and switch 78 is opened and switch 90 is closed, the galvanometer or meter employed at 87 is one adapted to operate on alternating current. The use of a direct current meter or galvanometer because of its linear readings is preferable over an alternating current one, the readings of which are inherently non-linear. The hand 91 of the galvanometer carries a pen which bears upon a strip of graph paper 92 moving between rollers 93 and 94 for the purpose of tracing a curve or making a graph as illustrated at 95. The rate of motion of the graph record or chart paper 92 is preferably proportional to the rate of motion of the electrode system E into or out of the borehole and this proportional motion may be accomplished by coupling an idler pulley 97, over which the conductor cable passes, with the paper transporting mechanism, by suitable means such as by shaft, belt or the like mechanical device similar to those disclosed in Jakosky Re. 21,797 or Elliott 2,222,608, or by electro-mechanical means as disclosed in Bowsky et al. 2,142,555 or as illustrated in Figure 1 herein, in which a Selsyn generator 99 is driven through a shaft 100 or other suitable gearing coupled to the idler pulley 97 and this generator is in turn electrically coupled through conductors 101 to a Selsyn motor 102 which in turn remotely drives the paper transporting roll 94 through suitable gearing such as a worm pinion 103 and worm gear 104 as illustrated.

Figure 3:
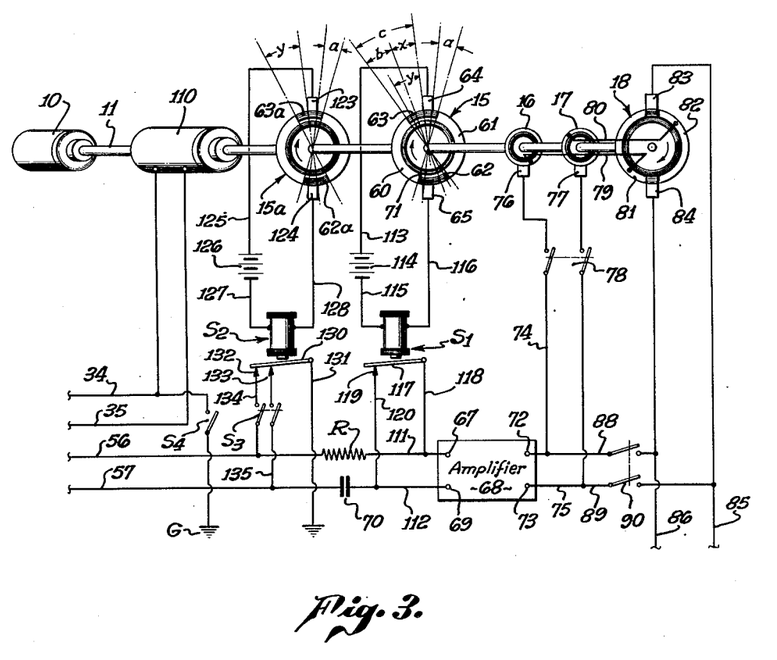
Figure 3 is a schematic diagram of an alternative form of a portion of the apparatus of the invention.

Referring now primarily to Figure 3 in which a modification of the apparatus of Figure 1 is illustrated, the conductors 34, 35, 56, 57, 85 and 86 leading away from the apparatus of Figure 3 make connection through the corresponding conductors and with the same apparatus as that shown and described in connection with Figure 1. In other words, conductors 34 and 35 of Figure 3 lead to the conductor cable drum connections and thence through the cable conductors 45 and 46 to the current input electrodes $C_1$ and $C_2$ as in Figure 1. Instead of employing a so-called down-the-hole ground, as when the electrode $C_1$ is connected to the bottom end of the sheath of the cable 42, if desired, one of the input conductors, such as, for example, conductor 34, may be grounded at G through switch $S_4$. Also, conductors 56 and 57 of Figure 3 lead to the cable drum connections and thence through cable conductors 47 and 48 to the potential pick-up electrodes $P_1$ and $P_2$, as in Figure 1. Similarly, conductors 85 and 86 of Figure 3 make connection with the meter 87 in the same manner as shown and described in connection with Figure 1. In Figure 3, instead of employing the portion of the apparatus comprising the battery 32, slip rings 12 and 13, commutator 14 and brushes 27 and 28 and the interconnecting conductors, as shown in Figure 1, an alternating current generator 110 is substituted, the armature of such generator being coupled to the hereinbefore described drive shaft 11 for rotation by the motor 10 in synchronism with the commutators 15, 15a and 18 also carried on the drive shaft. The alternating current output terminals of the generator 110 are connected to the conductors 34 and 35 which lead to the conductor cable drum connections as before described.

The beforementioned conductor 56 is connected to one of the input terminals 67 of the amplifier 68, through resistance R and conductor 111, and conductor 57 is connected to the other one of the input terminals 69 of the amplifier through condenser 70 and conductor 112.

The timing commutator 15 in Figure 3 may be of substantially the same construction as that in Figure 1. The opposite brushes 64 and 65 which bear on the surface of the timing commutator 15 are connected to the field winding of an electromagnetic relay $S_1$ through conductor 113, battery 114 and conductors 115 and 116. The armature piece 117, of the relay $S_1$ is connected through lead 118 to the conductor 111 and the relay contactor point 119 is connected through lead 120 to conductor 112. The armature 117 of the relay normally makes electrical contact with contactor point 119, as shown, when the field electromagnet of the relay is unenergized, and opens the circuit at contactor point 119 when the field electromagnet is energized, and thus the relay $S_1$ serves as an intermittently operative switching device for shunting or short circuiting the amplifier input connections in accordance with impulses from the timing circuit, comprising commutator 15 and battery 114 as hereinafter more fully described.

A second timing commutator 15a, similar in construction to commutator 15, is mounted on shaft 111 for rotation in synchronism with commutator 15 and the other devices mounted upon or coupled to the said shaft 11 as beforementioned.

A pair of diametrally opposite brushes 123 and 124 make sliding contact with the surface of commutator 15a and are connected to the field winding of an electromagnetic relay $S_2$ through conductor 125, battery 126, and conductors 127 and 128. The armature piece 130 of the relay $S_2$ is connected through lead 131 to ground and a pair of separate contactor points 132 and 133 are connected through leads 134 and 135 and switch $S_3$ to conductors 56 and 57 respectively. The armature 130 of relay $S_2$ normally makes electrical contact with contactor points 132 and 133 when the relay field is unenergized and opens the circuit at the contactor points when energized, and thus serves as an intermittently operative switching device for intermittently, simultaneously grounding and shutting or shortcircuiting the conductors 56 and 57 and the input conductors 47 and 48 in the conductor cable connected thereto in accordance with impulses from the timing circuit comprising commutator 15a as hereinafter more fully described.

The operation of the apparatus is as follows:

In the apparatus of Figure 1 the commutator system carried upon shaft 11 is driven by means of the motor 10 preferably at a substantially constant speed. During rotation a unidirectional potential is applied across the opposite segments 22 and 23 of the input commutator 14, from the direct current source 32, through conductors 30 and 31, slip rings 12 and 13 and conductor bars 20 and 21. As the commutator segments 22 and 23 rotate under the brushes 27 and 28 the unidirectional potential from the direct current source is transferred to the brushes in periodically reversed polarity, thereby generating an alternating potential across the brushes 27 and 28 of substantially square wave form. The square wave alternating potential thus generated at the brushes 27 and 28 results in an alternating current flow through the input electrode circuit comprising conductor 34, cable drum brush 36, slip ring 38, cable conductor 45, input electrode $C_1$ and thence through the well fluid and surrounding formation to input electrode $C_2$, and return to complete the circuit through cable conductor 46, drum slip ring 39, drum brush 37 and conductor 35 to commutator brush 28. The resulting current supplied to the input electrodes $C_1$ and $C_2$ if of a square wave form as before stated except as it is modified by the reactance and impedance characteristics of the input circuit including those of the formations, the major effective portion of which is found to be in the form of the resistance of and electrical capacity between the conductors 45 and 46 contained in the conductor cable. The resultant alternating current input to the formation and appearing at the input electrodes $C_1$ and $C_2$ is, therefore, of a modified square form having an appearance typically illustrated in Figure 2A. Here, the current wave, instead of having an ideally square form, is seen to have the portions of the curve at the points of polarity reversal, rounded off in a curve as shown at 136, which appears in form to represent an exponential rate of change of current, the constants of which are determined mainly by the capacity and resistance of the beforementioned conductor cable circuits to which the current is fed. Each half cycle of the approximately square wave thus consists of two principal portions; the initial, curved transitory portion 136 beginning at 0 degrees as shown in Figure 2 and persisting through (X) degrees, and following that, the steady or constant, unidirectional portion 137 extending through the balance of the half cycle from (X) degrees to 180 degrees as illustrated in Figure 2A.

Since the alternating current of the form illustrated in Figure 2A is applied to the formations surrounding the borehole between input electrodes $C_1$ and $C_2$ and since the formations are primarily resistive in electrical character, then the resultant alternating potential received between the potential pick-up electrodes $P_1$ and $P_2$ from the surrounding formations will be of similar form but of substantially reduced magnitude or amplitude as illustrated in Figure 2B, the initial curved or transitory portion of each half cycle being illustrated in dotted lines at 136' and the following equilibrium or constant amplitude portion in solid lines at 137'.

Due to the coupling between the input pair of conductors 45 and 46 and the output pair of conductors 47 and 48 leading from the pick-up electrodes $P_1$ and $P_2$, said coupling being principally that due to capacity unbalance between the conductors, although magnetic coupling may also be present to some degree, the initial transitory portion 136 of each of the input current waves as described in connection with Figure 2A produces a highly peaked, transitory potential across the output conductors 47 and 48 which has a typical form and phase relationship as illustrated at 138 in Figure 2B. When a low resistance condition exists between the current input electrodes $C_1$ and $C_2$ as when a water base drilling fluid is present in the borehole, this peaked portion corresponds approximately in form to the first differential of the form of the initial transitory portion 136 of the input current, both persisting from 0 to (X) degrees, as shown in Figures 2A and 2B. This peaked portion when superimposed upon the picked-up potential wave portions 136' picked up by electrodes $P_1$ and $P_2$, results in the alternating potential having a resultant wave form as illustrated by the solid lines in Figure 2B.

The resultant alternating potential of the type or form illustrated in Figure 2B is transmitted to the instruments at the earth surface from the pair of cable conductors 47, 48 by way of the circuit comprising drum slip ring 51, drum brush 54, conductor 56, and brush 64 through the output commutator 15 and return through brush 65, conductor 66, amplifier input 67, 69, condenser 70, conductor 57, drum brush 55, drum slip ring 52 and cable conductor 48.

As hereinbefore described, the output commutator 15 carries the two oppositely positioned commutator segments 60 and 61 separated by insulated spacer segments 62 and 63 which subtend equal rotational angles about the rotational axis. The output circuit from the pick-up electrodes $P_1$ and $P_2$ to the amplifier is thereby interrupted at the brushes 64 and 65 twice for each revolution, or once each 180 degrees for rotation of the commutator 15, the duration of each interruption being for (d) degrees of commutator rotation. The insulating separators 62 and 63 are made of such length with respect to both the commutator circumference and the brush width, and the commutator position adjusted upon the shaft 11 with relation to the rotational angular position of the commutator separator segments 25 and 26 of input commutator 14 or the angular position of brushes 64 and 65 adjusted with respect to said commutator 14 such that the before stated rotational angle (d) during which the input circuit to the amplifier 68 is interrupted is equal to the sum of the angle (a), the advance opening of the circuit prior to the initiation of the transient 136, angle (X), the angle of duration of the transitory portion of the cycle 136 and 136', and angle (b), the angle of retardation prior to reclosing the circuit to the amplifier following the termination of the transients, 136 and 136'. Thus the rotational angle (d), which equals the sum of angles (a), (X) and (b) or equals the sum of angles (a) and (c), is so proportioned and positioned with respect to the alternating potential wave as shown in Figure 2B as to open or interrupt the amplifier circuit (a) degrees in advance of the initiation of the transitory peak (138) and to close the amplifier circuit (c) degrees later or (b) degrees after the termination of the transitory peak 138. Thus the portion of the alternating potential cycle containing the transitory peak shown in dotted lines at 139 in Figure 2C is prevented from reaching the input of the amplifier while permitting only the square wave alternating potential, as illustrated in solid lines at 140 in Figure 2C, containing only the steady state, constant value, alternating unidirectional potential pulses to reach the said amplifier. All of that portion of the alternating potential wave whose form is influenced by or is a function of any impedance or reactance characteristics of the conductor cable and the formation being logged is thus, in effect, entirely eliminated, leaving only that portion of the wave which is of constant value and substantially only a function of the resistivity values of the said formations. It is only this latter, selected portion of the picked-up alternating potential which reaches the amplifier 68 and the electrical logging measuring or recording circuit.

The output from the amplifier 68 which has an amplified square wave form similar to that shown in solid lines in Figure 2C is applied across the opposite segments 81 and 82 of the rectifier commutator 18 by way of conductors 74 and 75, switch 78, brushes 76 and 77, slip rings 16 and 17 and conductors 79 and 80. The commutator 18 is so positioned upon the shaft 11 with respect to the commutator brushes 83 and 84 and with relation to the commutators 14 and 15 as to effect synchronous, full wave rectification of the amplifier output in conventional manner, resulting in an amplifier pulsating unidirectional input to the galvanometer 87 through conductors 85 and 86 having a wave form approximately as illustrated in Figure 2D.

The galvanometer 88 employed under the above described operating conditions is of conventional design and responsive only to the average value or the direct current equivalent of the applied pulsating unidirectional potential applied to it from the rectifier. The galvanometer hand 90 which is provided with a suitable pen or marking device, sweeps from side to side across the record or graph 92 in accordance with the variations in the beforementioned potential as affected by movement of the electrode system E through the borehole, and as different formation strata of different resistivities are encountered therein. As the electrode system is moved through the borehole, the motion of the conductor cable 42 is transferred from the pulley 97 through the Selsyn system comprising the generator 99 and the motor 102 to the roll 94 and paper 92 thereby resulting in the plotting of a logging curve as illustrated at 95 which is proportional in form to both the resistivity characteristics of the tested formations and the longitudinal displacement of the electrodes within the borehole.

The condenser 70 serves to block or exclude the flow of direct current through the commutator 15 and the input of the amplifier 68 which would result from the so-called natural potential difference usually existing between pick-up electrodes $P_1$ and $P_2$. Such current flow, which would occur in the absence of condenser 70, would be periodically interrupted by the commutator 15 resulting in an extremely troublesome extraneous signal output from the amplifier.

The initial transitory portions of each half cycle of the signal as shown and described for purposes of illustration in connection with Figure 2, while usually having an appearance and form similar to that illustrated at 138 in Figure 2B, may also take other, different forms depending upon the nature of electrical unbalance in the conductor cable and the character of the square wave generating apparatus. For example, the transient peak as illustrated at 138 in Figure 2B may be considered as due to a positive capacity unbalance between the input and output pairs of conductors in the cable because the polarity of the transient is the same in all cases as that of the remaining portion of the half cycle as illustrated at 137'. However, the conductor pairs in the cable may at times have a negative unbalance with respect to the other portion of the half cycle in which case the transient peaks would have polarities reversed to that illustrated in Figure 2B. Also the transient peaks, instead of each having a single pointed or spiked form as herein shown, may have two or more points or spikes and other irregularities largely dependent in this case upon the character of the square wave generating commutator or other alternating current source. Additionally the shape or form of these transient peaks may vary in slight degree during an electrical logging run as the conductor cable moves into or out of the well, such change being caused in part by variations in the stress placed upon the cable attendant upon its being wound upon and unwound from the cable drum, and subjected to variations in external fluid pressure and temperatures while suspended at different depths in a well borehole and to some extent upon the variations in the resistivity of the borehole fluid and formations.

In any event, whatever the magnitude, polarity or form of the transitory peaks may be they may be eliminated from the measuring current or potential by suitable construction, adjustment and action of the output commutator 15 to produce a resultant signal wave of the form illustrated in Figure 2C. Such required construction and adjustment may be determined by observing the wave form of the input potential at the amplifier input by suitable means such as a cathode ray oscilloscope. The required action of the commutator 15 may then be obtained by varying the commutator segment lengths and the relative phase angle positions of the brushes 64 and 65 until the irregular or transitory portions of the signal wave are eliminated leaving only a substantially square wave signal input indicated on the oscilloscope. Variation of the commutator segment lengths may be accomplished, in effect, by cut and try methods by substitution of different commutators having segments of progressively different increments of length until the required dimension is found as indicated by the oscilloscope wave forms.

While the alternating current supplied to the input circuits and current electrodes $C_1$ and $C_2$ has been described hereinbefore as preferably having a substantially square wave form, input alternating currents of other suitable wave forms may also be employed, the primary requisite of any such alternating current for its employment in the manner of this invention being that its wave form shall include, at some point or portion of each cycle or half cycle, a flat, constant current or constant amplitude portion of substantial and suitable time duration. Except for this requirement the alternating current wave form may include substantially any kind or degree of irregularity.

Figure 4:
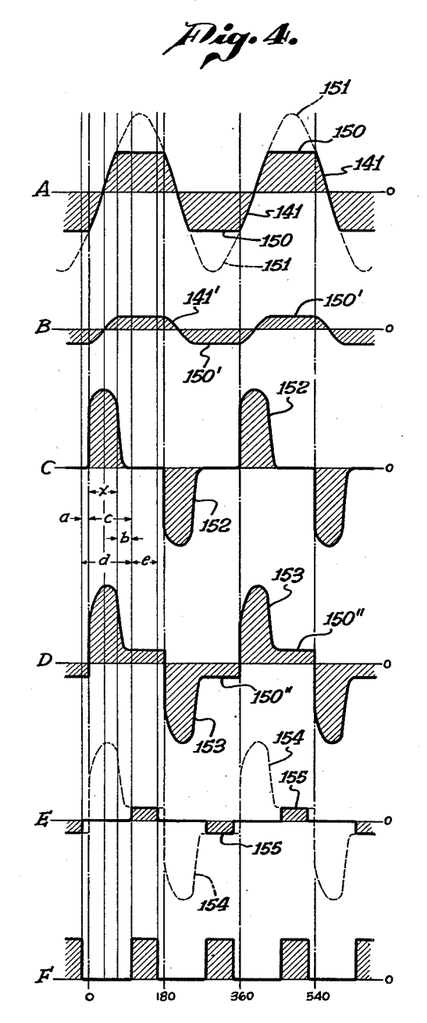
Figure 4 is a graphical illustration of the character of the electrical signals which may occur at various locations in the electric circuits of the apparatus of Figure 3 under certain conditions.

For example, Figure 4A illustrates the wave form of such another suitable alternating current which for purposes of illustration has been chosen as approximately trapezoidal, including flat, constant current portions, one in each half cycle, as shown at 150. An alternating current of this and other similar forms may be derived or generated by several well known means. For example, a sinusoidal alternating current as generated by a conventional alternating current generator, may be modified by chopping off or limiting the amplitude of the peaks of each half cycle thereof by well known current limiting means and in such manner as to remove, for example, the dotted line portion thereof shown at 151 in Figure 4A. The remaining portion of each half cycle of the thus modified alternating current will carry a flat topped constant amplitude portion parallel to the zero axis, as shown at 150 and sloping sides composed of the remaining portions of the sinusoidal wave as shown at 141.

Such an alternating current having an approximately trapezoidal wave form, or some other suitable wave form, having a flat, constant current, or constant amplitude portion also may be conveniently supplied by a suitable rotary machine, such as a rotary converter, alternator, or generator, the design and construction of such machines being well known. Such a generator may be employed in combination with the apparatus of this invention by substituting it in place of the commutator 14, the slip rings 12 and 13 and the associated battery circuits, shown in Figure 1, in the manner illustrated at 110 in Figure 3 and as hereinbefore described. Here the generator 110 is driven by means of the motor 10 and in synchronism with the timer commutators 15 and 15a and the rectifier commutator 18 through the common drive shaft 11.

The trapezoidal or other suitably formed alternating current, generated by the generator 110, is applied to the input electrode circuit comprising conductor 34, cable drum brush 36, slip ring 38, cable conductor 45, input electrode $C_1$ and thence through the well fluid and surrounding formations to input electrode $C_2$, and return to complete the circuit through cable conductor 46, drum slip ring 39, drum brush 37 and conductor 35 to the generator 110.

The current thus reaching the current input electrodes $C_1$ and $C_2$, assuming the generator to be designed to supply the alternating current of trapezoidal form as before mentioned, will also be approximately of trapezoidal form, the deviation therefrom as affected by the reactance and impedance characteristics of the input circuit and formations, varying from great to negligible depending upon whether the slopes of the sides of the waves are critically great, as in the case where the trapezoidal wave approaches a square wave form, or moderate as in the case where the sides, as at 141, are portions of sinusoidal waves which have been modified in the manner hereinbefore described in connection with Figure 4A.

As a result of the alternating current having a wave form approximately that shown in Figure 4 being applied to the formations surrounding the borehole between electrodes $C_1$ and $C_2$ and since the formations are primarily resistive in electrical character, the resultant alternating potential received between the potential pick-up electrodes $P_1$ and $P_2$ from the surrounding formations will be of a similar form, but due to the spaced arrangement of the electrodes, it will be of substantially reduced magnitude or amplitude as illustrated in Figure 2B, the sinusoidal or transition portion of each half cycle being shown at 141' and the flat, constant amplitude portion being shown at 150'.

Due to the electrical coupling between the input pair of conductors 45 and 46 and the output pair of conductors 47 and 48 in the conductor cable, as hereinbefore explained, the transition portions of each half cycle of the input current wave usually produces a peaked potential wave component between the output conductors 47 and 48, having an appearance and phase relationship approximately as shown at 152 in Figure 4C. This produced potential wave or transient component has a form which corresponds approximately to the first differential of that of the producing potential represented in Figure 4A, when the shunt resistance formed between conductors 45, 46, 47 and 48 through the electrodes and the surrounding well fluid and formations is relatively low. In other words, the produced potential between conductors 57 and 58 will closely follow the differential of the producing potential when the resistance of the shunting path is sufficiently low to impart a time constant to the circuit comprising the total effective capacity between the conductors 57 and 58 and the discharge path for such capacity which is relatively high with respect to the inducing or producing frequency.

The thus produced potential component 152 of Figure 4C when combined with or superimposed upon the picked-up potential component 150', 141' of Figure 4B, results in an alternating potential between the output pair of conductors 47 and 48 having a resultant wave form approximately as illustrated at 150", 153 in Figure 4D.

This resultant potential is transmitted to the instrument of the earth surface from the pair of cable conductors 47, 48 in the case of the apparatus of Figure 1, by way of the circuit comprising drum slip ring 51, drum brush 54, conductor 56, and brush 64, through the output commutator 15 and return through brush 65, conductor 66, amplifier input 67, 69, condenser 70, conductor 57, drum brush 55, drum slip rings 52 and return to cable conductor 48.

In the case of the apparatus of Figure 3, this resultant potential between the output pair of conductors 47 and 48 having a resultant wave form approximately as illustrated in Figure 4D, as hereinbefore described, is transmitted to the instruments at the earth surface from the pair of cable conductors 47 and 48, by way of the circuit comprising drum slip ring 51, drum brush 54, conductor 56, resistance R and conductor 111 to the amplifier input terminal 67, and return from amplifier input terminal 69 through conductor 112, condenser 70, conductor 57, drum brush 55 and drum slip rings 52.

The commutators 15, as hereinbefore described in connection with both Figures 1 and 3, carry two oppositely positioned commutator segments 60 and 61 separated by insulated spacer segments 62 and 63 which subtend equal and directly opposite rotational angles about the rotational axis. In the apparatus of Figure 3 the brushes 64 and 65 of the commutator 15 are connected by way of conductors 113, 115, and 116 in series with a battery 114 and the electromagnet field coil of the relay or magnetic switching device S₁.

As the commutator 15 rotates the electrical circuit through the battery 114 and the relay field coil is periodically completed at the brushes 64 and 65 through the commutator, twice for each revolution or once each 180° of rotation, the duration of each completion of the circuit being for (e) degrees of commutator rotation as shown in relation to the phase of the potential wave in Figure 4. In other words, the relay circuit is interrupted at the brushes 64 and 65 twice for each revolution, or once each 180° of rotation of the commutator 15, during the time the brushes are wholly resting upon or passing over the commutator insulating segments 62 and 63, the duration of each such interruption being for 180°−(e)=(d) degrees of commutator rotation. As in the case of the commutator 15 of the apparatus of Figure 1, the insulating separators 62 and 63 of the apparatus of Figure 3 are made of such length with respect to the commutator's circumference and the brush widths, and positioned with relation to the phase angle of the current or potential output wave from the generator 110 and with respect to the brush positions such that the rotational angle (d), during which the battery circuit through the field coil of relay S₁ is open, is equal to the sum of angles (a), the advance opening of the circuit prior to the initiation of the transient, angle (X), the angle of duration of the transitory portion of the cycle, and angle (b), the angle of retardation prior to reestablishing the electrical circuit from the battery 114 through the field coil of the relay S₁ following the termination of the transient.

When the electrical circuit from the battery 114 through the relay field coil of relay S₁ is closed, the armature 117 of the relay is moved toward the field coil magnet breaking the electrical contact at 119, thus opening the electrical shunt or short circuit between the conductors 111 and 112 across the amplifier input terminals 67 and 69. Upon breaking the battery circuit through the relay field coil the relay armature or bar 117 moves away from the field magnet, closing the contact at 119, thus reestablishing the short circuit between the conductors 111 and 112 across the input terminals 67 and 69 of the amplifier.

Thus the relay S₁ as controlled by the timer apparatus comprising the commutator 15 interrupts or inactivates the input of the amplifier 68 periodically, the period of interruption or inactivation being equal to the sum of the beforementioned angles (a), (X) and (b) or equal to the angle (d) as indicated in Figure 4. The circuit is completed through the relay to open the relay S₁ and thereby to remove the shortcircuit from the amplifier input during the remaining portion of the half cycle throughout angle (e).

Thus the timing of the relay is such that the effect of the portion of the alternating potential cycle containing the transitory peak and a suitable amount of the cycle on either side thereof as shown in dotted lines at 155 in Figure 4E, is entirely eliminated, leaving the circuit open or active through to the amplifier and to the measuring apparatus during only the constant potential portion illustrated in solid lines at 155 in Figure 4E. The alternating potential wave thus impressed upon the amplifier input and the measuring devices following the amplifier, contains only the steady state, constant amplitude, alternating potential pulses of the type illustrated in solid lines in Figure 4E, if the measurements are to be made in the alternating current form, or the unidirectional potential pulses as illustrated in Figure 4F if the amplified signal is rectified at 18 prior to measurement by suitable means such as the galvanometer or volt meter 87. All of that portion of the alternating potential wave whose form is influenced by or is a function of any impedance or reactance characteristics of the conductor cable, and the formations being logged, is thus entirely eliminated, leaving only that portion of the wave which is of constant value or constant amplitude and hence which is substantially only a function of the resistivity values of the said formations, to be applied in the electrical logging measurement. As before stated, it is only this selected portion of the picked-up alternating potential having a constant value or amplitude which reaches the amplifier 68 and the electrical logging measuring or recording circuit.

When a direct current measuring instrument such as a galvanometer is employed, the output from the amplifier 68 which has an amplified form similar to that shown in Figure 4E, may be applied across the opposite segments 81 and 82 of the rectifier commutator 18 by way of conductors 74 and 75 and switch 78 and thence in an amplified and rectified form as illustrated in Figure 4F through conductors 85 and 86 to the recording galvanometer 87 and recording apparatus as hereinbefore described in connection with Figure 1. When an alternating current measuring instrument is employed, switch 78 may be opened and switch 90 closed and the amplifier output impressed directly through conductors 88, 89, 85 and 86 upon the meter 87.

During the hereinbefore described operations in connection with the apparatus of Figure 3 and curves of Figure 4 corresponding to conditions of low borehole fluid and formation resistance, the switch $S_3$ can remain open, thus rendering the circuit and timing device comprising relay $S_2$ and commutator 15a inactive in so far as their effect upon the operation of the apparatus is concerned. Under conditions where the borehole fluid or formation resistances are unusually high, such as, for example, where the portion of the borehole to be logged contains an oil base drilling fluid or where the formations being logged have a high resistance, a different set of conditions is sometimes encountered for which the apparatus is preferably operated as hereinafter described.

When the electrodes are submerged in a high resistance drilling fluid such as, for example, fresh water, oil or an oil base drilling fluid, or where the formation surrounding the borehole are of unusually high resistance as beforementioned, the electric potential which is produced between the potential pick-up conductors 47 and 48 in the manner hereinbefore described, can not be discharged rapidly and hence the resultant charge persists for a considerably longer time than is the case when employing a low resistance drilling fluid such as, for example, a water base mud through which such potential charge may be discharged rapidly. In extreme cases this time may be such as to occupy a large portion of the alternating current cycle which would otherwise be available or suitable for the logging measurements.

Figure 5:
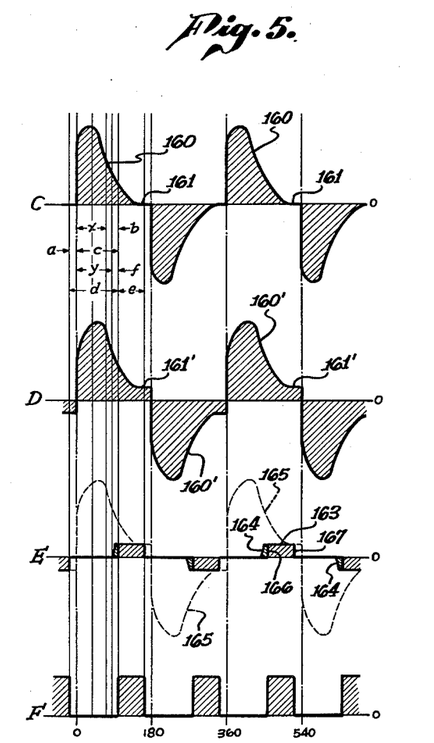
Figure 5 is a graphical illustration of the character of the electrical signals which may occur at various locations in the electric circuits of the apparatus of Figure 3 under certain other conditions.

For example, when the resistance between the electrodes is low, the charge produced between the cable conductors 47 and 48 is discharged at a high rate over a relatively short time in a manner which may be indicated by the shape of that portion of the potential curve shown at 138 in Figure 2B or at 152 in Figure 4C permitting the potential wave to assume a constant potential or constant amplitude form over a substantial portion of each half cycle as shown at 137' in Figure 2B or as shown at 150'' in Figure 4D. However, when the resistance between the electrodes is high, as beforementioned, the charge is discharged at a lower rate over a relatively longer interval of time as indicated for one extreme case, by the shape of the curve shown at 160 in Figure 5C. In the latter case it is seen that the discharge time is so long that it occupies a substantial part of the whole of each half cycle and consequently the produced potential wave settles down or assumes a uniform amplitude form over only a relatively small portion or interval of the cycle, such as that portion shown at 161.

Such an alternating produced potential as that having the wave form illustrated in Figure 5C if superimposed upon the alternating picked-up potential from the electrodes $P_1$ and $P_2$ having the form illustrated in Figure 4B would result in an alternating potential having a resultant wave form as illustrated in Figure 5D, and here again it is seen that only a relatively short portion or interval of the cycle as shown at 161' would remain as a constant potential or constant amplitude portion which could be usefully employed for the electrical logging measurements in the manner hereinbefore described in connection with the apparatus of Figures 1 and 3 and curves of Figures 2 and 4A to 4F The result of such reduction of the relative time interval of the constant amplitude portion of the cycle which may be used for the logging measurements is to proportionally reduce the sensitivity of the system. To overcome this latter difficulty and make it possible to make electric logging measurements having satisfactory degrees of sensitivity under such conditions of high resistance as hereinbefore just described the apparatus comprising the relay $S_2$ and its associated timing circuit and commutator 15a may be employed to effect a rapid discharge of the pick-up potential during or immediately following each charging interval thereby increasing the relative length of the constant potential portion of the cycle, as follows:

During this latter operation, switch $S_3$ remains closed. Brushes 123 and 124 are positioned to leave and break contact with the conductive portion of the commutator 15a and move onto the insulating segments 62a and 63a either simultaneously or slightly later than the breaking of contact of the brushes 64 and 65 with the conductive portions of commutator 15 and their movement onto the insulating segments 62 and 63 thereof. In connection with the illustrated mode of operation of the apparatus of Figure 3 and the curves of Figure 5 this action of breaking contact is assumed, for convenience of description to be simultaneous and at an angle of (a) degrees in advance of the initiation of the transient charge produced in the potential pick-up conductors. The circuits through the field coils of the relays $S_1$ and $S_2$ are thus simultaneously de-energized by the action of the commutators 15 and 15a, permitting the armature of relay $S_2$ to complete the circuit between conductors 56 and 57 through switch $S_3$, conductors 134 and 135 and contact points 132 and 133 and simultaneously to ground them through conductor 131, and permitting relay $S_1$ simultaneously to complete the shunt or short circuit between the amplifier input conductors 111 and 112 through conductor 120, contact point 119, relay armature 117 and conductor 118. The pick-up cable conductors 56 and 57 and the input to the amplifier 68 are thus simultaneously short circuited.

The insulating segments 62a and 63a of commutator 15a are made of such length as to close the circuit between brushes 62a and 63a and thus to energize the field coil of relay $S_2$ and open the relay circuit, (Y) degrees after the initiation of the transient or the inducing potential which tends to produce the transient. Thus during $(a)+(Y)$ degrees of each half cycle the conductors 56 and 57 are virtually short circuited, preventing the transient potential produced between them by the electrical unbalance as hereinbefore explained from rising to any measurable degree.

The potential picked-up electrodes $P_1$ and $P_2$ as illustrated in Figure 4B is also affected by the before described periodical shortcircuiting of the conductors 56 and 57 and thus the combined effect upon these superimposed potentials is to produce a potential wave between the conductors 56 and 57 at a point on the outside or well side of resistance R and condenser 70 having the wave form illustrated in solid lines at 163, 164 in Figure 5E, extending through the interval of $(f)+(e)$ degrees. Thus that portion of the potential wave shown in dotted lines at 165 in Figure 5E including the transient portion thereof is prevented from forming.

At (Y) degrees in the cycle, the potential is lower than the picked-up potential 150 or 163 but immediately after the removal of the short circuit by the opening of the relay $S_2$ at the end of the (Y) degrees interval, the potential quickly rises as shown at 164 to the picked-up constant potential equilibrium value. During this time, through $(a)+(Y)$ degrees of the cycle the amplifier input conductors 111 and 112 have remained short circuited through relay circuit $S_1$, and the commutator segments 62 and 63 of commutator 15 are made of such length as to cause the relay $S_1$ to remain closed for an additional period of $(f)$ degrees to permit the potential rise at 164 to be completed to an equilibrium, constant amplitude value before removing the short circuit from the amplifier input and permitting this potential to be impressed upon the amplifier input.

The presence of resistance R in the circuit between conductors 56 and 111 serves to restrict the flow of current through the shorting circuit path 120, 119, 117 and 118 of relay $S_1$ after the contacts of relay $S_2$ have opened and prior to the opening of the contact of relay $S_1$ during the interval of $(f)$ degrees, such that the potential can return quickly to the equilibrium, or constant amplitude or constant potential value as shown at 164, and thereby will have reached such constant potential before being impressed upon the amplifier input by opening of the relay $S_1$.

Thus the amplifier 68 is rendered inactive throughout $(a)+(Y)+(f) \equiv (d)$ degrees of each half cycle as illustrated in Figure 5E during the transient portions of the cycle and thereby the effect of the transient portion represented by dotted lines at 165 in Figure 5E is entirely eliminated and the amplifier is rendered active by permitting only the remaining constant potential portion of each half cycle shown in solid lines at 166, 163, 167 in Figure 5E to reach the amplifier input.

The resultant amplified signal from the amplifier 68 may be measured either by alternating current or direct current measuring devices as hereinbefore described. If the resultant amplified signal is rectified prior to measurement its wave form will finally appear as illustrated at Figure 5F'.

As previously stated the current supplied to the input circuit and current electrodes $C_1$ and $C_2$ may be of substantially any wave form so long as such wave form includes, at some point or portion of each cycle, a flat, constant current or constant amplitude portion of substantial and suitable time duration. Under some circumstances the wave form of such supplied current may be of such irregularity as to have only one constant current or constant amplitude interval in each cycle and under such conditions the output commutator 15 employed as shown in Figure 1, or the timing commutator 15 as shown in Figure 3, may, by employing suitable reduction gearing, be run at one half synchronous speed with respect to the alternating current supplied by the generating device. Under the latter conditions a separate rectifier stage following the timing commutating stage is unnecessary, because only unidirectional pulses of one polarity would pass the commutator 15 to the amplifier 68.

A convenient and operative frequency of alternating current supplied to the current output electrodes from the current supply means such as the commutator 14, the generator 110 or the like device, has been found to be 15 cycles per second, although an alternating current of considerably higher or lower frequencies may also be employed. The resistance R may be of approximately 10,000 ohms and the condenser 70 may have a capacity of approximately 25 micro-farads. A typical conductor cable such as that employed at 42 in connection with this invention may be from 10,000 to 15,000 feet long, and may have a resistance of approximately 150 to 200 ohms per conductor therein. The resistance between the pick-up electrodes in electrical logging runs in a water base drilling mud will vary from 0 to approximately 100 ohms and in an oil base drilling fluid from 0 to approximately 2000 ohms.

While synchronous commutation devices have been herein disclosed as illustrating a preferred method and apparatus for generating the square wave input signal, the elimination of transients, and the rectification of the signal to be measured, other equivalent methods and apparatus can obviously be employed. For example, magnetically operated vibrator switching devices may be employed with synchronism of operation between them being attained by energizing them with a common alternating or pulsating control current or by alternating or pulsating currents from a common source of control. Electronic means can also be employed for the several beforementioned method steps, but synchronous switching as by a vibrating switch or rotating commutator as disclosed herein is preferred for the final rectification stage because of its true linearity over any desired range of potentials or currents which it is required to handle as contrasted with the limited range of such operation of electronic rectifier devices.

The timing of the switching operations to exclude the transient portions of the alternating current cycle, from the measuring circuit whereby only the constant amplitude portion thereof is employed for the logging measurements may be determined by observing the form of the potential wave appearing in the potential pick-up conductors in a suitable cathode ray oscilloscope. The timing and required durations of switching intervals may then be determined by inspection.

While, hereinbefore, the potential pick-up electrodes $P_1$ and $P_2$ have been disclosed and described as being both located within the borehole below the current input electrodes, $C_1$ and $C_2$, other electrode configurations which are well known in the electrical logging art are possible without departure from the principles and advantages of this invention. For example, the potential pick-up electrodes $P_1$ and $P_2$ may be located within the borehole, above the current input electrodes $C_1$ and $C_2$ with similar results as is well known. Also under some circumstances only one of the potential pick-up electrodes may be located within the borehole while the other pick-up electrode is located and grounded at or adjacent the ground surface. For example, instead of employing potential pick-up electrode $P_2$ within the borehole as shown in Figure 1, the conductor 57 may be disconnected from it by opening switch $S_5$ and grounded by closing switch S₆. The pick-up electrode P₂ is thus, in effect, located at the ground connection P₂'. In the latter arrangement depending upon which is grounded at the surface, one or the other of the conductors illustrated at 47 or 48 may be unused and, if desired, omitted from the conductor cable 42. However this nonuse or omission of the conductor will not effect the need of nor the principles involved in the invention as hereinbefore described.

It is to be understood that the term "generator" as employed herein is to include all generating devices such as commutators, vibrating interruptors or switches, electronic oscillators, conventional electro-mechanical generators or alternators and the like. It is also to be understood that the term "rectifier" as herein employed, while disclosed as preferably of a commutator or other mechanical type, also includes electronic, chemical, selenium, copper oxide and the like suitable types. Also, the term "timer" or "timing device" as herein employed is not limited to mechanical devices such as commutators or vibrating switches and relays but also includes electronic devices which may be controlled in synchronism with the alternating current by means well known in the art.

The terms, measuring the alternating or unidirectional potential, current or signal as employed herein in the specification and claims are not to be limited in meaning to actual quantitative determination of such values in terms of volts, amperes or the like, but include the actuation of any means or device such as an ammeter, voltmeter or the like whereby a visual indication or graphical record of a measure of such values may be obtained. For example, the step of measuring the potential obtained from the pick-up electrodes may comprise actuating the metering device 88 by a resultant potential or current or the like signal whereby the member 90 will be moved a distance which may be directly proportional to or any predetermined function of the said potential, current or signal. Thus, as the system of electrodes including the pick-up electrodes is moved through the borehole during an electrical logging run, a graphical or visual representation of a suitable function of variations of the formation resistivities encountered may be made as, for example, a graph or curve as illustrated at 95 on the moving paper 92 of Figure 1. Likewise the term "meter" as employed herein shall have an equally broad meaning.

It is to be understood that the foregoing is illustrative only, and that the invention is not limited thereby but may include various modifications and changes made by those skilled in the art without distinguishing from the spirit and scope of the invention as defined in the appended claims.

I claim:

1. In electrical logging apparatus wherein an alternating current is conducted through an input conductor contained in a conductor cable to an input current electrode in a borehole and thence through the surrounding formations to another electrode to establish an electric field in the surrounding formations around said input current electrode and wherein a portion of such electric field is tested by a pair of spaced, potential pick-up electrodes in said borehole and the potential thus picked up is conducted to the top of said borehole through a pair of conductors contained in said cable to measuring apparatus at the surface exterior to said borehole, the apparatus comprising: a generator of an alternating current having a wave form which includes a constant amplitude portion and a varying amplitude portion in the cycle; electrical connection from said generator to said other electrode and to said input conductor adjacent the top end of said conductor cable whereby said alternating current may be conducted through said conductor to said input current electrode adjacent the other end of said cable and thence through the surrounding formations to said other electrode; an electric meter; connections from said pair of conductors contained in said conductor cable to said meter whereby a potential may be applied to said meter which is representative of a potential appearing between the conductors of said pair of conductors; and switching apparatus for periodically grounding said pair of conductors for a predetermined fractional portion of the cycle.

2. In electrical logging apparatus wherein an alternating current is conducted through an input conductor contained in a conductor cable to an input current electrode in a borehole and thence through the surrounding formations to another electrode to establish an electric field in the surrounding formations around said input current electrode and wherein a portion of such electric field is tested by a pair of spaced, potential pick-up electrodes in said borehole and the potential thus picked up is conducted to the top of said borehole through a pair of conductors contained in said cable to measuring apparatus at the surface exterior to said borehole, the apparatus comprising: a generator of said alternating current having a wave form which includes a constant amplitude portion and a varying amplitude portion in the cycle; electrical connection from said generator to said other electrode and to said input conductor adjacent the top end of said conductor cable whereby said alternating current may be conducted through said conductor to said input current electrode adjacent the other end of said cable and thence through the surrounding formations to the said other electrode; an electric meter; connections from said pair of conductors contained in said conductor cable to said meter whereby a potential may be applied to said meter which is representative of a potential appearing between the conductors of said pair of conductors; and switching apparatus for connecting the conductors of said pair of conductors together through a low resistance current path, for a predetermined fractional portion of the cycle.

3. In electrical logging apparatus wherein an alternating current is conducted through an input conductor contained in a conductor cable to an input current electrode in a borehole and thence through the surrounding formations to another electrode to establish an electric field in the surrounding formations around said input current electrode and wherein a portion of such electric field is tested by a pair of spaced, potential pick-up electrodes in said borehole and the potential thus picked up is conducted to the top of said borehole through a pair of conductors contained in said cable to measuring apparatus at the surface exterior to said borehole, the apparatus comprising: a generator of said alternating current having a wave form which includes a constant amplitude portion and a varying amplitude portion in the cycle; electrical connection from said generator to said other electrode and to said input current conductor adjacent the top end of said conductor cable whereby said alternating current may be conducted through said input current conductor to said input current electrode adjacent the other end of said cable and thence through the surrounding formations to the said other electrode; an electric meter; connections from said pair of conductors contained in said conductor cable to said meter whereby a potential may be applied to said meter which is representative of a potential appearing between the conductors of said pair of conductors; switching apparatus for connecting the conductors of said pair of conductors together through a low resistance current path, for a predetermined fractional portion of the cycle; and switching apparatus for alternately energizing and deenergizing the said meter to measure said potential for a predetermined fractional portion of the cycle which is exclusive of the said predetermined fractional portion of the cycle during which the said conductors are connected together.

4. In electrical logging apparatus wherein an alternating current is conducted through an input conductor contained in a conductor cable to an input current electrode in a borehole and thence through the surrounding formations to another electrode to establish an electric field in the surrounding formations around said input current electrode and wherein a portion of such electric field is tested by a pair of spaced, potential pick-up electrodes in said borehole and the potential thus picked up is conducted to the top of said borehole through a pair of conductors contained in said cable to measuring apparatus at the surface exterior to said borehole, the apparatus comprising: a generator of said alternating current having a wave form which includes a constant amplitude portion and a varying amplitude portion in the cycle; electrical connection from said generator to said other electrode and to said input conductor adjacent the top end of said conductor cable whereby said alternating current may be conducted through said conductor to said input current electrode adjacent the other end of said cable and thence through the surrounding formations to the said other electrode; an electric measuring circuit; connections from said pair of conductors contained in said conductor cable to said measuring circuit whereby an alternating potential may be applied to said measuring circuit which is representative of a potential appearing between the conductors of said pair of conductors; switching apparatus for alternatingly energizing and deenergizing the said measuring circuit; and a timer for actuating said switching apparatus in synchronism with said alternating current and at such times as to energize said measuring circuit for a predetermined fractional portion of each half of the cycle of said alternating potential applied to said measuring circuit.

5. In electrical logging apparatus wherein an alternating current is conducted through an input conductor contained in a conductor cable to an input current electrode in a borehole and thence through the surrounding formations to another electrode to establish an electric field in the surrounding formations around said input current electrode and wherein a portion of such electric field is tested by a pair of spaced, potential pick-up electrodes in said borehole and the potential thus picked up is conducted to the top of said borehole through a pair of conductors contained in said conductor cable to measuring apparatus at the surface, exterior to said borehole, the apparatus comprising: a generator of said alternating current having a wave form which includes a constant amplitude portion and a varying amplitude portion in the cycle; electrical connection from said generator to said other electrode and to said input conductor adjacent the top end of said conductor cable whereby said alternating current may be conducted through said conductor to said input current electrode adjacent the other end of said cable and thence through the surrounding formations to the said other electrode; a rectifier; electrical connections from said pair of conductors contained in said conductor cable to said rectifier whereby a potential may be applied to said rectifier which is representative of that appearing between the conductors of said pair of conductors; an electric meter; electrical connections from said rectifier to said meter; switching apparatus for controlling the time and duration of the application of the potential applied from said rectifier through said electrical connections to said meter; and a timer for actuating said switching apparatus in synchronism with said alternating current and at such times as to periodically apply said potential from said rectifier to said meter for a predetermined fractional portion of the cycle of said alternating current.

6. In an electrical logging system wherein an alternating current is conducted through an input conductor contained in a conductor cable to an input current electrode in contact with fluid or surrounding formations in a borehole and thence through the surrounding formations to another electrode to establish an electric field in the surrounding formations around said input electrode and wherein a portion of such electric field is tested by a pair of spaced, potential pick-up electrodes in contact with fluid or formations in said borehole and the potential thus picked up is conducted through a pair of conductors contained in said conductor cable to measuring apparatus at the surface, exterior to said borehole, the method comprising: generating an alternating electric potential having a wave form including a constant amplitude portion and a varying amplitude portion in the cycle; applying said alternating potential between said conductor leading to said input electrode and said other electrode and thereby establishing an alternating electric field in the formations surrounding said input electrode, said field having a wave form substantially corresponding to that of said alternating potential; picking up with said potential pick-up electrodes the alternating potential appearing between said potential pick-up electrodes resulting from said alternating electric field, the said picked-up alternating potential being conducted to the surface through said pair of conductors; intermittently connecting the conductors of said pair of conductors together, at the surface, through a low resistance current path during the time intervals which are inclusive of that of said varying amplitude portions of the cycle and maintaining said conductors disconnected from one another during at least a portion of the time interval of a constant amplitude portion of the cycle; and measuring the potential between said conductors while said conductors are maintained disconnected from one another and during the said time interval of said constant amplitude portion of the cycle.

7. In an electrical logging system wherein an alternating current is conducted through an input conductor contained in a conductor cable to an input current electrode in contact with fluid or surrounding formations in a borehole and thence through the surrounding formations to another electrode to establish an electric field in the surrounding formations around said input electrode and wherein a portion of such electric field is tested by a pair of spaced, potential pick-up electrodes in contact with fluid or formations in said borehole and the potential thus picked up is conducted through a pair of conductors contained in said conductor cable to measuring apparatus at the surface, exterior to said borehole, the method comprising: generating an alternating electric current having a periodically occurring wave form including constant amplitude portions and varying amplitude portions in each cycle; flowing said alternating current through said conductor to said input electrode and thence to said other electrode thereby establishing an alternating electric field in the formations surrounding said input electrode, said field having a periodically occurring wave form substantially corresponding to that of said alternating current; picking up with said potential pick-up electrodes the alternating potential appearing between said potential pick-up electrodes resulting from said alternating electric field whereby the thus picked-up alternating potential is conducted to the surface through said pair of conductors; periodically, alternately connecting together and disconnecting the said conductors of said pair of conductors, at the surface, through a low resistance current path, the time intervals during which such conductors are thus connected together being substantially coincident with said varying amplitude portions of the said alternating current cycles, and the time intervals during which said conductors are disconnected from one another including at least a portion of the time intervals during the constant amplitude portions of the said alternating current cycles; and measuring the potentials appearing between said conductors at the surface during at least a portion of the time intervals when said conductors are thus disconnected from one another.

8. Apparatus according to claim 2 and means simultaneously to ground said pair of conductors during said predetermined fractional portion of the cycle when said conductors of said pair of conductors are connected together through said low resistance current path.

9. Apparatus according to claim 3 and means simultaneously to ground said pair of conductors during said predetermined fractional portion of the cycle when said conductors of said pair of conductors are connected together through said low resistance current path.

10. In electrical logging apparatus wherein an alternating current is conducted through an input conductor contained in a conductor cable to an input current electrode in a borehole and thence through the surrounding formations to another electrode to establish an electric field in the surrounding formations around said input current electrode and wherein a portion of such electric field is tested by a pair of spaced, potential pick-up electrodes in said borehole and the potential thus picked up is conducted to the top of said borehole through a pair of conductors contained in said cable to measuring apparatus at the surface exterior to said borehole, the apparatus comprising: a generator of said alternating current having a wave form which includes a constant amplitude portion and a varying amplitude portion in the cycle; electrical connections from said generator to said other electrode and to said input conductor adjacent the top end of said conductor cable whereby said alternating current may be conducted through said conductor to said input current electrode adjacent the other end of said cable and thence through the surrounding formations to the said other electrode; an electric metering circuit; connections from each of the conductors of said pair of conductors to opposite input terminals of said metering circuit, said connections comprising a resistance and a capacitance in series with the said input; a first switching means for connecting the conductors of said pair of conductors together through a first low resistance current path for a predetermined fractional portion of the cycle; and a second switching means for connecting the terminals of said metering circuit together through a second low resistance current path for a predetermined fractional portion of the cycle.

11. Apparatus according to claim 10 in which said first switching means comprises a timer and means to drive said timer in synchronism with said generator so as to connect the conductors of said pair of conductors together through said first low resistance path during a time interval at least inclusive of the said varying amplitude portion of the said cycle; and said second switching means comprising a timer and means to drive said timer in synchronism with said generator so as to connect the said input terminals of said metering circuit together through said second low resistance path during a time interval which is at least inclusive of the first-mentioned time interval.

12. Apparatus according to claim 11 and means to ground the conductors of said pair of conductors simultaneously with said connecting thereof together.

RUSSELL G. NORELIUS.

REFERENCES CITED

The following references are of record in the file of this patent:

UNITED STATES PATENTS

| Number | Name | Date |
| --- | --- | --- |
| 1,826,961 | Slichter | Oct. 13, 1931 |
| 2,046,436 | Wascheck | July 7, 1936 |
| 2,265,978 | Batchelder | Dec. 16, 1941 |
| 2,371,658 | Stewart | Mar. 20, 1945 |
| 2,404,622 | Doan | July 23, 1946 |